United States Patent
Huynh et al.

(10) Patent No.: US 6,871,492 B2
(45) Date of Patent: Mar. 29, 2005

(54) PROCESS AND SYSTEM FOR CONTROLLING THE MIXTURE COMPOSITION FOR A SPARK IGNITION OTTO ENGINE WITH AN NOX STORAGE CATALYST DURING A REGENERATION PHASE

(75) Inventors: Ngoc-Hoa Huynh, Leonberg (DE); Lorenz Salzer, Friolzheim (DE); Ulf-Peter Schmeling, Rutesheim (DE); Peter Gerl, Esslingen (DE)

(73) Assignees: Dr. Ing. h.c.F. Porsche AG, Stuttgart (DE); Audi AG, Ingolstadt (DE); Bayerische Motoren Werke AG, Munich (DE); DaimlerChrysler AG, Stuttgart (DE); Volkswagon AG, Wolfsburg (DE)

(*) Notice: Subject to any disclaimer, the term of this patent is extended or adjusted under 35 U.S.C. 154(b) by 59 days.

(21) Appl. No.: 10/218,903

(22) Filed: Aug. 15, 2002

(65) Prior Publication Data

US 2003/0056500 A1 Mar. 27, 2003

(30) Foreign Application Priority Data

Aug. 16, 2001 (DE) .......................... 101 39 992

(51) Int. Cl.$^7$ ................................ F01N 3/00
(52) U.S. Cl. ...................... 60/295; 60/274; 60/297
(58) Field of Search .................. 60/274, 276, 285, 60/295, 297, 286

(56) References Cited

U.S. PATENT DOCUMENTS

| 5,437,153 A | * | 8/1995 | Takeshima et al. ........... 60/276 |
| 5,771,685 A | * | 6/1998 | Hepburn |
| 6,105,365 A | * | 8/2000 | Deeba et al. ................. 60/274 |
| 6,161,377 A | * | 12/2000 | Boegner et al. .............. 60/274 |
| 6,167,695 B1 | * | 1/2001 | Itou et al. ..................... 60/274 |
| 6,327,848 B1 | * | 12/2001 | Poggio et al. ................ 60/276 |
| 6,389,802 B1 | * | 5/2002 | Berger et al. ................. 60/274 |

FOREIGN PATENT DOCUMENTS

| EP | 0 884 458 A2 | * 12/1998 |
| WO | WO 98/55742 | * 12/1998 |

* cited by examiner

Primary Examiner—Binh Tran
(74) Attorney, Agent, or Firm—Crowell & Moring LLP

(57) ABSTRACT

A process and a system are used for controlling the mixture composition for an Otto engine with an $NO_x$ storage catalyst during a regeneration phase. The process includes controlling, to the value of one, a $\lambda$-value ($\lambda_M$) of an exhaust gas fed to the $NO_x$ storage catalyst during a regeneration phase as a function of a $\lambda$-value ($\lambda_K$) of an exhaust gas emitted by the $NO_x$ storage catalyst. The system includes a control device for controlling, to the value of one, a $\lambda$-value ($\lambda_M$) of the exhaust gas fed to the $NO_x$ storage catalyst during the regeneration phase as a function of the $\lambda$-value ($\lambda_K$) of the exhaust gas emitted by the $NO_x$ storage catalyst.

4 Claims, 5 Drawing Sheets c[CO] = 3.5%
c[HC] = 500 ppm c[CO] = 0.8%
c[HC] = 3000 ppm

PROCESS AND SYSTEM FOR CONTROLLING THE MIXTURE COMPOSITION FOR A SPARK IGNITION OTTO ENGINE WITH AN NOX STORAGE CATALYST DURING A REGENERATION PHASE

This application claims the priority of Federal Republic of Germany Patent Document No. 101 39 992.8, filed Aug. 16, 2001, the disclosure of which is expressly incorporated by reference herein.

BACKGROUND AND SUMMARY OF THE INVENTION

The prevent invention relates to a process and to a system for controlling the mixture composition for a spark ignition engine with an $NO_x$ storage catalyst during a regeneration phase.

The pollutant emission of spark ignition engines can be effectively reduced by a catalytic aftertreatment. This essentially involves the removal of harmful constituents from the exhaust gas. A catalyst promotes the afterburning of reactive CO and HC to form harmless carbon dioxide ($CO_2$) and water ($H_2O$) and simultaneously reduces nitrogen oxides ($NO_x$) occurring in the exhaust gas to neutral nitrogen ($N_2$).

A three-way catalyst, for example, is customary which simultaneously reduces all three pollutants—CO, HC and $NO_x$. It has a tube structure made of a ceramic material which is coated with precious metals, preferably with platinum and rhodium, which accelerate the chemical reduction of the pollutants.

The catalytic three-way process requires that the mixture has a stoichiometric composition. A stoichiometric mixture composition is characterized by an air ratio $\lambda=1.00$. In the case of this mixture composition, the catalyst operates at a very high efficiency. Even a deviation of only one percent considerably impairs the efficiency of the pollutant conversion.

To regulate the mixture, the known $\lambda$-probe supplies a signal related to the momentary mixture composition to the control unit. The $\lambda$-probe is installed in the exhaust pipe of the engine at a point at which the exhaust gas homogeneity required for the functioning of the system exists over the entire operating range of the engine.

For reasons of consumption, it is desirable to operate spark ignition Otto engines in a manner similar to the operation of diesel engines with an excess of air (i.e., lean with $\lambda>1$), in as many operating conditions as possible in order to reduce the throttling losses during the charge cycle. The achievable $\lambda$-values are a function of the mixture preparation method of the basic engine and, in the case of stratified charge engines or direct injection engines, may reach a six-fold air excess ($\lambda=6$).

However, in this lean operating mode, the known three-way catalysts are useless because they require a stoichiometric ($\lambda=1$) mixture and exhaust gas in order to convert the nitrogen oxides ($NO_x$).

To solve this problem, $NO_x$ storage catalysts are used which, during the lean operation, remove $NO_x$ from the exhaust gas and store it. Regeneration phases are artificially generated by the engine timing gear when, for example, the $NO_x$ content of the exhaust gas behind the $NO_x$ storage catalyst exceeds a predetermined threshold value. The regeneration is normally started by an adjustment of the $\lambda$-value of the main combustion ($\lambda_M$) from a lean value to a rich value of less than 1, for example, 0.76. It will be terminated when a predetermined time period of the rich phase has ended. At that moment, the mixture is adjusted back to lean.

There is a large number of publications on the problem of $NO_x$ storage and the regeneration of the $NO_x$ storage catalyst. With respect to engine timing, the objects are two-fold: First, the load condition of catalyst should be detected, and second, in the $NO_x$ regeneration phase, the reducing agents should be provided precisely in accordance with the requirement because the reducing agents are also composed of test-relevant pollutants. Furthermore, the change-over operation between the lean and rich phases should not be noticeable to the driver. Without exception, the known processes operate with time-controlled strategies of a rich-lean change-over whose pulse duty ratio is determined in a more or less costly manner by the detection of the occurring $NO_x$ amount. Strategies are also known, which measure the breaking-through of the storage device using an $NO_x$ sensor and, as required, trigger a regeneration. Concerning the $NO_x$ sensors, it is also known that they have a considerable transverse sensitivity to $NH_3$, so that they can indicate the correct $NO_x$ concentration only in the case of a stoichiometric and overstoichiometric exhaust gas composition ($\lambda \geq 1$; $NH_3$-free).

The known processes require considerable coordination expenditures, particularly when taking into account different load conditions. The aging behavior and the degree of sulfur poisoning of the $NO_x$ storage catalyst can be controlled only at considerable control-related expenditures and definitely not in a reliable manner. In other words, the processing speed changes during the regeneration process because it is a function of the aging and sulfur poisoning condition. The fixed duration and $\lambda_M$ during regeneration, in the case of aged or poisoned $NO_x$ storage catalysts, inevitably result in a significant increase of the CO and HC emissions.

FIG. 5 is a schematic representation of a known directly injecting Otto engine with an $NO_x$ storage catalyst.

In FIG. 5, reference number 1 indicates an internal-combustion engine with four cylinders A to D; reference number 2 indicates an air filter; reference number 3 indicates a throttle valve; reference number 20 indicates intake pipes; and reference number 40 indicates swirl flaps for generating the turbulence for the respective cylinders A to D; reference number 9 indicates an exhaust pipe; reference numbers 4a and 4b indicate a respective three-way precatalyst for the cylinder groups B, C and A, D, respectively; reference number 5 indicates an $NO_x$ storage catalyst; reference number 10a indicates a $\lambda_M$ sensor; reference number 10b indicates a $\lambda_K/NO_x$ sensor; and reference number 8 indicates a rear muffler.

FIG. 6 is a time lapse diagram of the $\lambda$-values $\lambda_M$ in front of the $NO_x$ storage catalyst and $\lambda_K$ behind the $NO_x$ storage catalyst in the case of a regeneration phase of the $NO_x$ storage catalyst of the Otto engine according to FIG. 5.

As illustrated in FIG. 6, the $\lambda_M$ value is changed at a defined time abruptly from a lean value of 1.45 to a rich value of 0.76. On the whole, the regeneration phase according to FIG. 6 takes five seconds, after which the $\lambda_M$ is set back to the original lean value of 1.45.

With respect to the $\lambda_K$ value behind the $NO_x$ storage catalyst, three different phases can be recognized. In phase 1, a complete conversion takes place of the offered reducing agent (CO, HC). The value of $\lambda_K$ is therefore barely above 1. In phase 2, a decelerated conversion of the offered reducing agent takes place and therefore a breaking-though of HC and CO. In this phase 2, the value of $\lambda_K$ falls slightly below the stoichiometric value, specifically in the illustrated example, to approximately 0.92. In phase 3, an attenuation of the conversion of the offered reducing agent takes place in connection with a drop of the $\lambda_K$ value to the $\lambda_M$ value. Correspondingly, the harmful exhaust HC/CO breaking-through takes place in this phase.

The present invention is based on the recognition that a $\lambda_K$ curve would be desirable which is indicated in FIG. 6 by the broken line S2, and extends in an approximately constant manner at $\lambda_K$ approximately equal to 1 to the end of the regeneration phase. A corresponding course of the $\lambda_M$ value is indicated in FIG. 6 by a dash-dotted line S1. In other words, it would have to be provided that the $\lambda_M$ value in front of the $NO_x$ storage catalyst is raised with the start of the decelerated conversion of the offered reducing agent in order to counteract the breaking-through of the HC/CO and the resulting lowering of the $\lambda_K$ value.

It is therefore an object of the present invention to provide a process and a system for controlling the mixture composition for an Otto engine with an $NO_x$ storage catalyst during a regeneration phase which, when the $NO_x$ storage catalysts are aged or poisoned, result in no increased CO and HC emissions.

The process according to the invention for controlling the mixture composition for an Otto engine with an $NO_x$ storage catalyst during a regeneration phase and the corresponding system respectively have the advantage that a system designed or operated according to the invention automatically adapts itself to the characteristics of different catalyst coatings or different aging or sulfur poisoning conditions. In addition, from the control behavior, the condition of the storage catalyst can be determined regarding the sulfur regeneration requirement or for diagnostic purposes.

In the present invention, the $\lambda_M$ value of the exhaust gas fed to the $NO_x$ storage catalyst in the course of the regeneration phase is controlled with a closed loop control circuit to keep the $\lambda_K$ value of the exhaust gas emitted from the $NO_x$ storage catalyst. Preferably, the control starts only from a predetermined intervention value $\lambda_i$.

In the invention, a commercially available $NO_x$ sensor is preferably used downstream of the $NO_x$ storage catalyst, which sensor measures the $\lambda_K$ of the exhaust gas, in addition to the $NO_x$ concentration. The $\lambda_K$ behind the $NO_x$ storage catalyst, when enriched, remains stoichiometric (=1) or overstoichiometric (>1) precisely, independently of the $\lambda_M$ in front of the $NO_x$ storage catalyst, as long as the $NO_x$ storage catalyst can completely process the offered reducing agent (CO, HC).

According to a preferred further development, the control is set up such that the $\lambda_K$ value of the exhaust gas emitted by the $NO_x$ storage catalyst is maintained at about one, i.e., it does not fall below a value of one or falls only insignificantly below a value of one. As a result, the catalyst operates at high efficiency. Preferably, the $\lambda_K$ value is maintained between 0.98 and 1.02, more preferably between 0.99 and 1.01, most preferably between 0.995 and 1.005. The controlled range of $\lambda_K$ varies depending on the design criteria of a specific application.

According to another preferred further development, the regeneration phase is initiated when the $NO_x$ content of the exhaust gas emitted by the $NO_x$ storage catalyst exceeds a predetermined value.

According to another preferred further development, the regeneration phase will be terminated when the signal of an $NO_x$ sensor behind the $NO_x$ storage catalyst and/or its rise exceeds a predetermined value. Advantageously, the $NH_3$ transverse sensitivity of an $NO_x$ sensor downstream of the $NO_x$ storage catalyst can be utilized which signals the conclusion of the storage device regeneration considerably sooner than the $\lambda_K$ signal. It is useful to detect the end of the regeneration not only by way of the threshold value of the $NO_x$ signal ($NH_3$ signal) but also its rise.

According to another preferred further development, the regeneration phase is terminated when the $\lambda_K$ value of the exhaust gas emitted by the $NO_x$ storage catalyst falls below a predetermined value. However, because of a long gas transit time between the combustion space (reducing agent production) and the measuring site (downstream of the $NO_x$ storage catalyst), this approach is less effective.

According to another preferred further development, the $\lambda_M$ value of the exhaust gas fed to the $NO_x$ storage catalyst is controlled at the beginning of the regeneration phase to a constant pilot value $\lambda_{REG}$ and the control of $\lambda_K$ to one is not started before the $\lambda_K$ value of the exhaust gas emitted by the $NO_x$ storage catalyst falls below a predetermined intervention value $\lambda_i$. It was found to be favorable to use the signal of the $\lambda$-probe close to the engine together with a pilot value $0.76 < \lambda_{REG} < 1$ adapted to the regeneration task for controlling the mixture composition in order to ensure the required control speed and accuracy. In the further course of the regeneration, the $\lambda_M$ value is modified corresponding to the progress of the regeneration by a predetermined fixed or adaptive algorithm.

According to another preferred further development, the constant pilot value $\lambda_{REG}$ is obtained by making a predetermined afterinjection and controlling the $\lambda$-value of the main combustion such that the $\lambda_M$ value of the exhaust gas fed to the $NO_x$ storage catalyst assumes the constant pilot value $\lambda_{REF}$.

The required reducing agent can be provided by overenriching the combustion (main combustion) utilized for generating the power of the internal-combustion engine, as well as by an afterinjection. When the reducing agent is added by an overenriched main combustion ($0.76 < \lambda_M < 1.0$), CO is preferably generated. When the reducing agent is added by an afterinjection, HC is produced as the reducing agent. When CO is preferably used as a reducing agent, in phase 1 of the regeneration, an undesirable breaking-through of $NO_x$ takes place which predominantly comprises of NO (nitrogen monoxide).

In the case of a preferred use of HC in this phase 1, this breaking-through of $NO_x$ does not take place or is at least considerably reduced. The cause is the competitive situation which exists during phase 1 between the $NO_x$ storage device and $O_2$ storage devices of the catalysts. Before the $O_2$ storage devices are evacuated, CO can not reliably reduce $NO_x$ to $N_2$. This embodiment therefore suggests that, during phase 1 of the regeneration, the HC content of the exhaust gas be adjusted by an afterinjection to, for example, a value>3,000 ppm in front of the $NO_x$ storage catalyst, and the phases 2 and 3 be regenerated by enriching the main combustion and, in the process, control the $\lambda$ value of the main combustion. This is advantageous because high HC concentrations are no longer converted as the regeneration progresses and result in the breaking-through of HC.

According to another preferred further development, the control device controls the $\lambda$-value of the exhaust gas fed to the $NO_x$ storage catalyst according to the following relation:

$$\lambda_M = \lambda_{REG} + k^*(\lambda_i - \lambda_K)$$

wherein k is a constant; $\lambda_M$ is the $\lambda$-value of the main combustion; and $\lambda_K$ is the $\lambda$-value of the exhaust gas emitted by the $NO_x$ storage catalyst.

DETAILED DESCRIPTION OF THE DRAWINGS

In the figures, the same reference numbers indicate the same elements or elements having the same functions.

Without restricting the generality, the present invention will be described using a direct-injecting Otto engine having an $NO_x$ storage catalyst.

Figure 1:
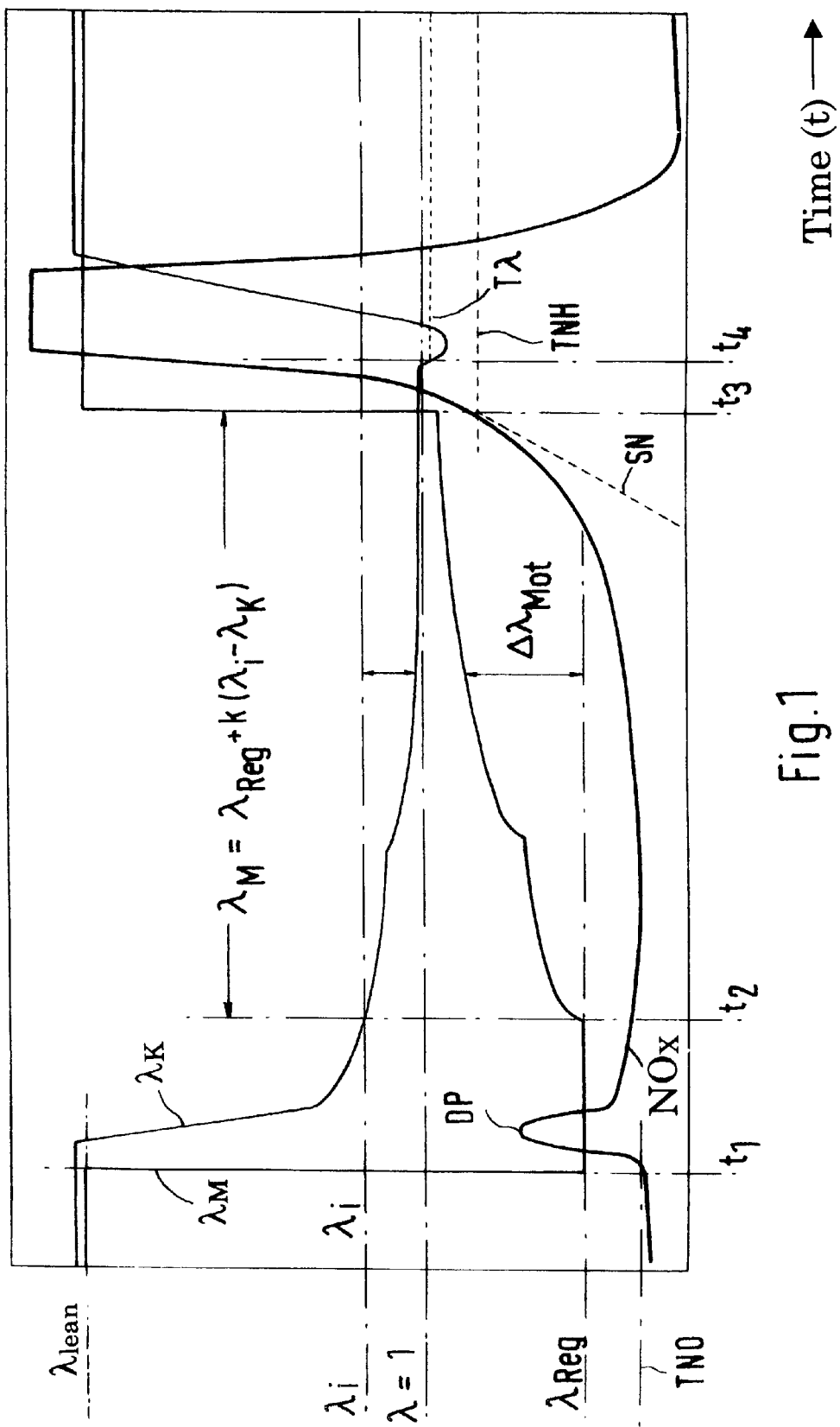
FIG. 1 is a time lapse diagram of the λ-values, $\lambda_M$ in front of the $NO_x$ storage catalyst, and $\lambda_K$ behind the $NO_x$ storage catalyst as well as of the signal of the $NO_x$ sensor during a regeneration phase of the $NO_x$ storage catalyst of the Otto engine according to FIG. 5 for explaining an embodiment of the process according to the invention.

According to FIG. 1, the $NO_x$ signal detected by the sensor 10b causes the start of the regeneration phase when the $NO_x$ signal exceeds a predetermined threshold value TNO.

In this case, $\lambda_M$ of the main combustion is adjusted at time $t_1$ from a lean value $\lambda_{lean}$ (for example, 6) abruptly to a rich pilot value $\lambda_{REG}$ of, for example, 0.76 and is held constant there until the time $t_2$.

$\lambda_K$ behind the $NO_x$ storage catalyst 5, which is detected by the sensor 10b, decreases to an intervention value $\lambda_i$ between time $t_1$ and time $t_2$. When the intervention value $\lambda_i$ is reached, $\lambda_M$ of the main combustion is controlled by the formula, $$\lambda_M = \lambda_{REG} + k^*(\lambda_i - \lambda_K)$$

wherein k is a constant; $\lambda_M$ is the λ-value of the main combustion; and $\lambda_K$ is the λ-value of the exhaust gas emitted by the $NO_x$ storage catalyst. In this case, the value $\lambda_K$ is also detected by the sensor 10b behind the $NO_x$ storage catalyst 5.

This control results in a rise of $\lambda_M$ with the progress of the regeneration phase. This decreasing enrichment has the effect that the decelerated conversion of the offered reducing agent (CO, HC) in the $NO_x$ storage catalyst 5 is taken into account and a release of unwanted HC and CO emissions is counteracted.

After the start of the regeneration phase, the $NO_x$ signal detected by the sensor 10b has a so-called desorption peak value DP, which is a result of the fact that, because of the enriching of the main combustion, CO is preferably used as a reducing agent in phase 1, that is, until the intervention value $\lambda_i$ is reached. After the desorption peak value DP has been reached, the $NO_x$ will drop again significantly. Only at the end of the regeneration phase, will the $NO_x$ signal increase again considerably because of the $NH_3$ transverse sensitivity of the sensor 10b, and, at time $t_3$, will reach the rate of increase SN at the value TNH.

When time $t_3$ has been reached, $\lambda_M$ of the main combustion is set again to the value $\lambda_{lean}$, which terminates the regeneration phase. Another possibility of terminating the regeneration phase would be the detection of the drop of the $\lambda_K$ value after the end of the regeneration, particularly the defining of a threshold value Tλ for the $\lambda_K$ value, as shown in FIG. 1. However, this is not very effective if a long gas transit time exists between the combustion space, thus the space of the reducing agent production, and the measuring site of the sensor 10b downstream of the $NO_x$ storage catalyst 5.

Because of the control of $\lambda_M$ according to the first embodiment, the system for controlling the mixture composition during the regeneration phase can be automatically adapted to aging and/or sulfur poisoning conditions.

Figure 2:
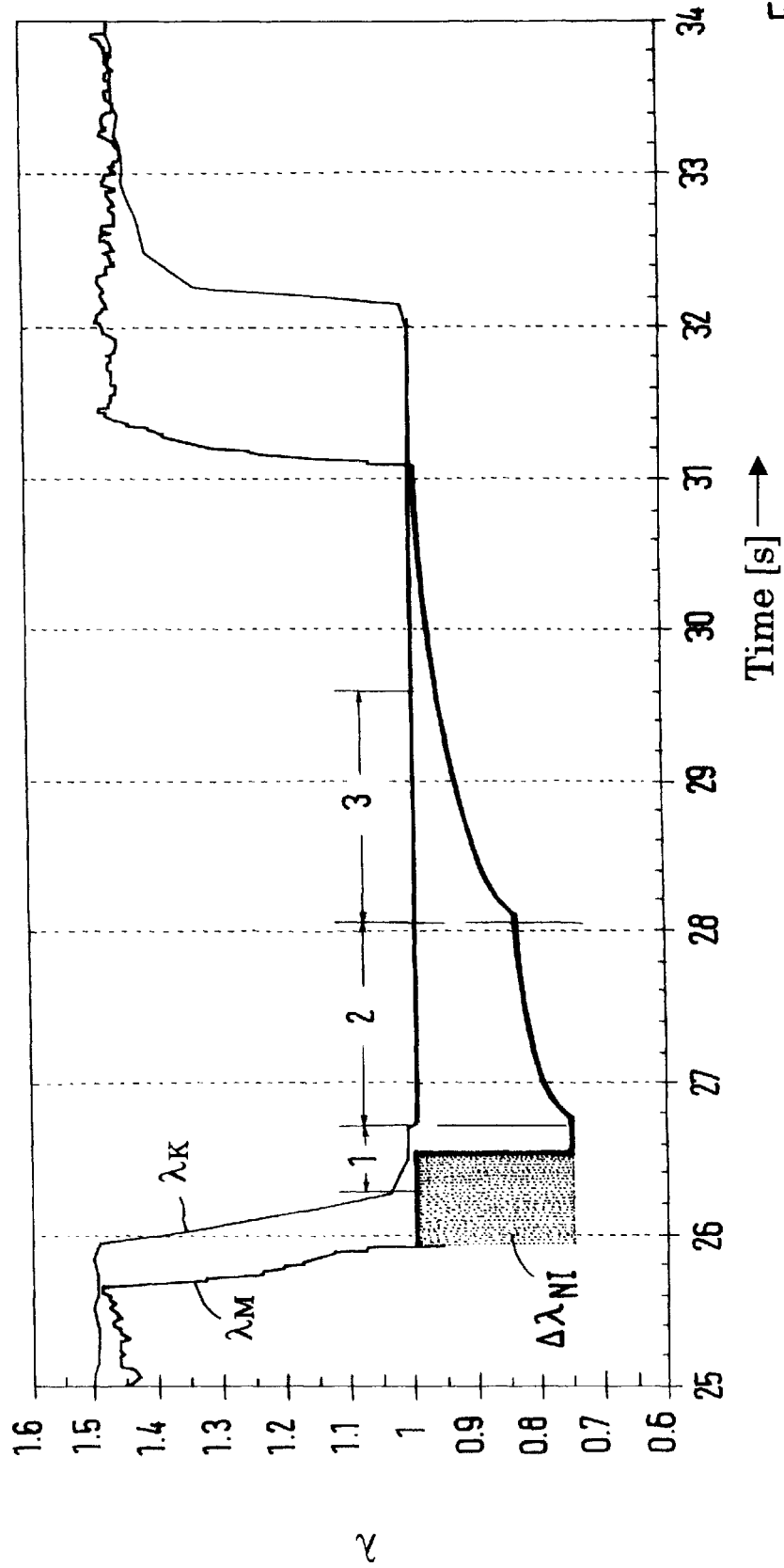
FIG. 2 is a time lapse diagram of the λ-values, $\lambda_M$ in front of the $NO_x$ storage catalyst and $\lambda_K$ behind the $NO_x$ storage catalyst, during a regeneration phase of the $NO_x$ storage catalyst of the Otto engine according to FIG. 5 for explaining another embodiment of the process according to the invention.

In the embodiment according to FIG. 2, the reducing agent is added in phase 1 by an afterinjection NI. In other words, the constant pilot value $\lambda_{REG}$ is obtained by making the predetermined afterinjection NI and by controlling the λ-value of the main combustion in a complementary fashion such that $\lambda_M$ value of the exhaust gas fed to the $NO_x$ storage catalyst 5 assumes the constant pilot value $\lambda_{REG}$, until the intervention value $\lambda_i$ has been reached by $\lambda_K$.

This has the advantage that the undesired breaking-through of $NO_x$ in phase 1, which leads to the desorption peak value DP according to FIG. 1, can be avoided. In this embodiment, the fact is taken into account that CO can reliably reduce $NO_x$ to $N_2$ only when the $O_2$ storage devices are evacuated. This evacuation of the $O_2$ storage devices takes place by the increased addition of HC as a result of the afterinjection at the start of the regeneration phase.

Figure 4:
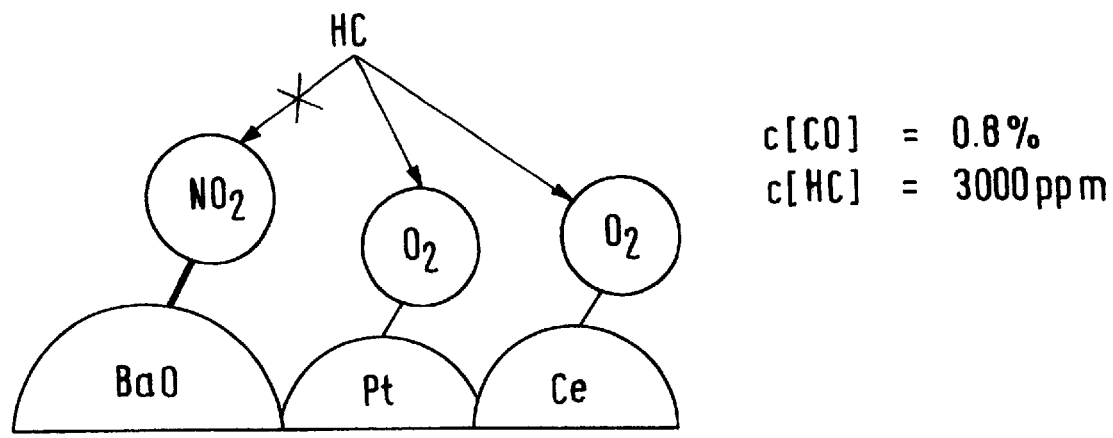
FIG. 4 is an illustration for explaining a regeneration with an afterinjection.
Figure 5:
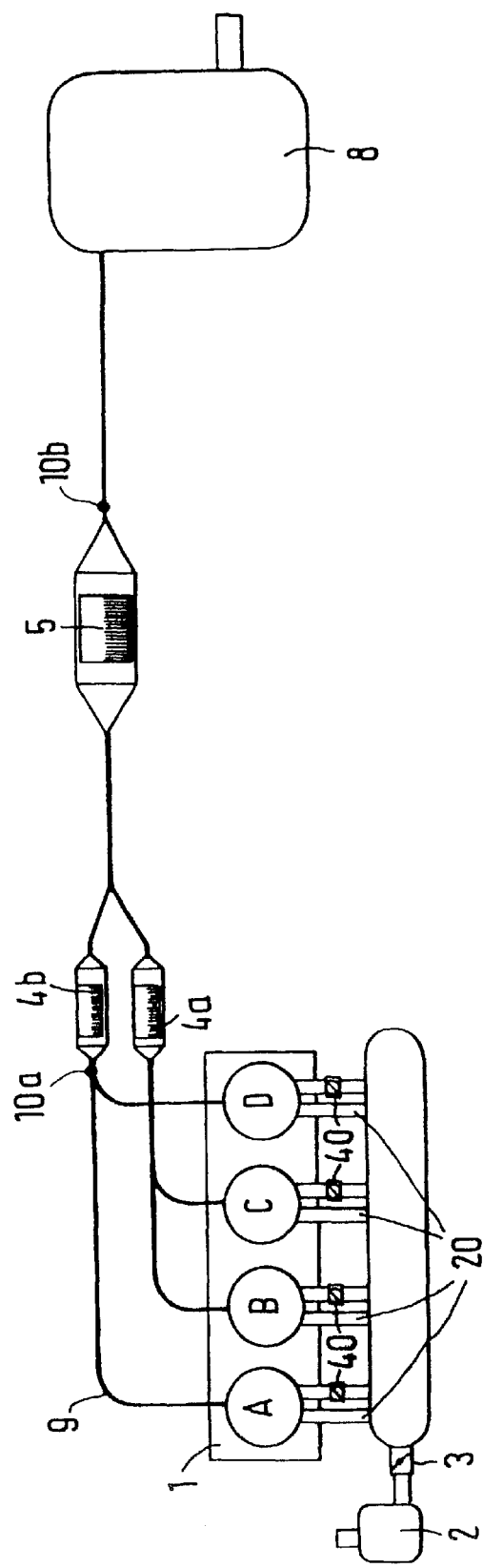
FIG. 5 is a schematic representation of a known direct-injecting Otto engine having an $NO_x$ storage catalyst.
Figure 6:
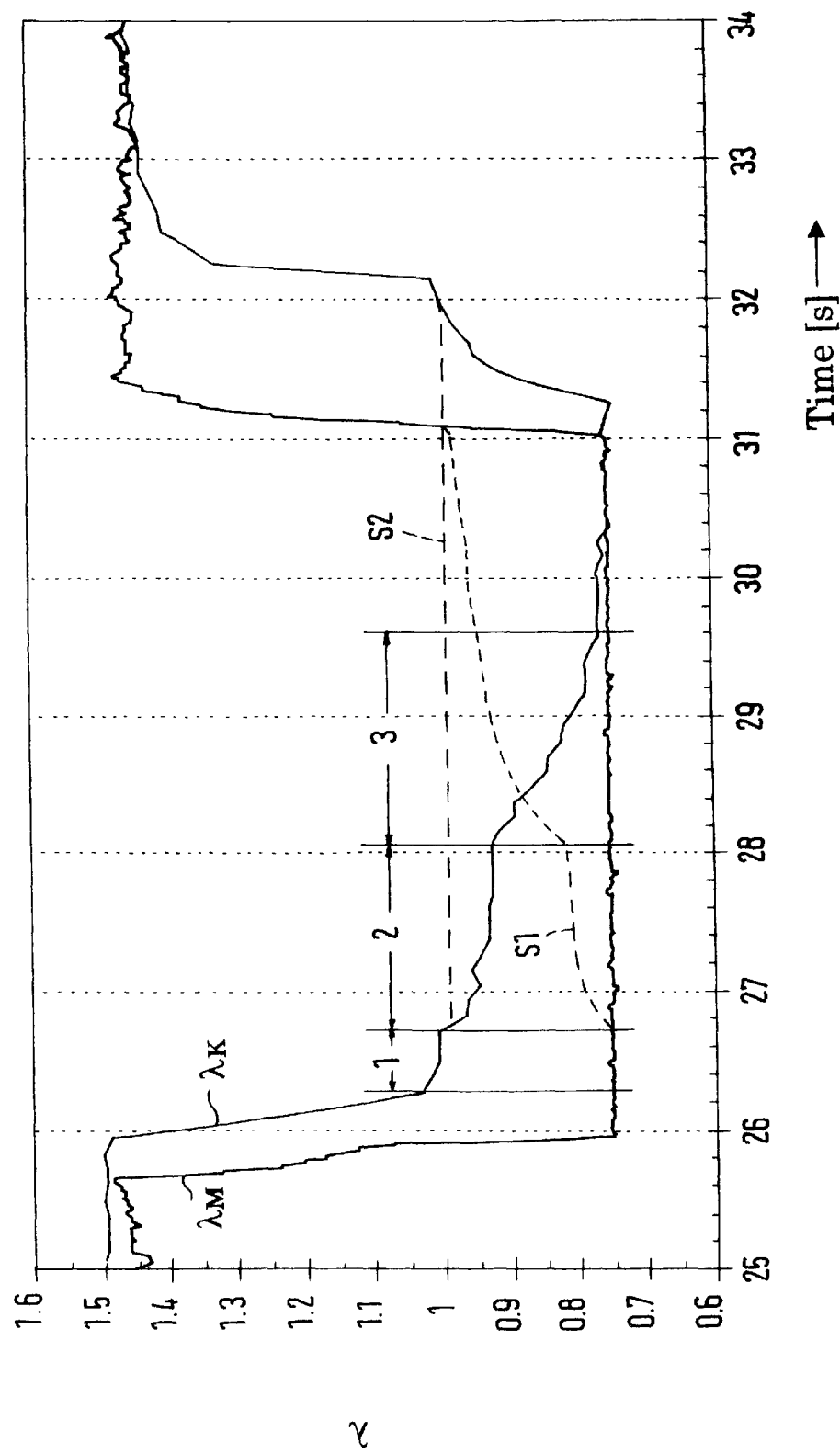
FIG. 6 is a time lapse diagram of the λ-values, $\lambda_M$ in front of the $NO_x$ storage catalyst and $\lambda_K$ behind the $NO_x$ storage catalyst, during a regeneration phase of the $NO_x$ storage catalyst of the Otto engine according to FIG. 5.

As illustrated in FIG. 4, in the phase of the afterinjection NI, the CO content in front of the $NO_x$ storage catalyst 5 amounts to only 0.8%, while the HC content amounts to 3,000 ppm. The reason is that HC does not reduce the $NO_2$, which is preferably attached to BaO, but first reduces the $O_2$ storage devices, which are preferably attached to Pt or Ce. Before the intervention value $\lambda_i$ is reached, the afterinjection NI will not be stopped and the $\lambda_M$ value will be controlled according to the above-explained relation starting from the pilot value $\lambda_{REG}$ in the direction λ=1.

Figure 3:
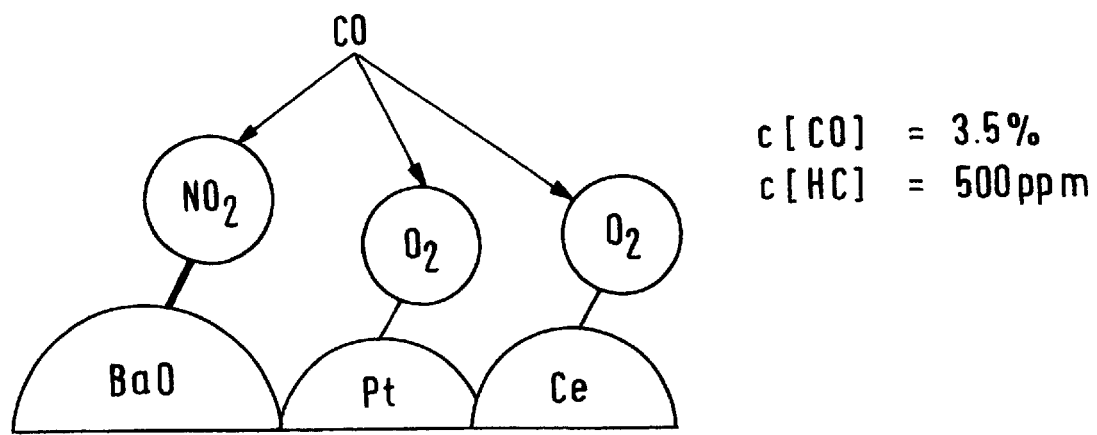
FIG. 3 is an illustration for explaining a regeneration with the main combustion.

This has the result that, in phases 2 and 3, in which the control takes place, a CO content of 3.5% and an HC content of 500 ppm exist in front of the $NO_x$ storage catalyst 5, as illustrated in FIG. 3.

Since, as a result of this type of regeneration, the breaking-through of $NO_x$ can be avoided in phase 1, the end of the storage device regeneration can even more easily be detected by following the rise of the $NO_x$ signal because of the $NH_3$ transverse sensitivity of the sensor 10b.

Although the present invention was explained above by means of preferred embodiments, it is not limited thereto but can be modified in multiple manners. In particular, for example, the adaptation of the λ-value of the exhaust gas fed to the $NO_x$ storage catalyst may take place not only by a comparison with an intervention value but also adaptively while including preceding regenerations.

What is claimed:

1. A process for controlling the mixture composition for an Otto engine with an NOx storage catalyst during a regeneration phase, the process comprising:

controlling, to the value of one, a λ-value (λM) of an exhaust gas fed to the NOx storage catalyst during a regeneration phase as a function of a λ-value (λK) of an exhaust gas emitted by the NOx storage catalyst, wherein the step of controlling the λ-value (λM) of the exhaust gas fed to the NOx storage catalyst includes controlling the λ-value (λM) such that the λ-value (λK) of the exhaust gas emitted by the NOx storage catalyst does not fall under a value of one or falls only insignificantly under a value of one;

initiating the regeneration phase when an NOx content of the exhaust gas emitted by the NOx storage catalyst exceeds a predetermined value;

terminating the regeneration phase when the λ-value (λK) of the exhaust gas emitted by the NOx storage catalyst falls below a predetermined value;

controlling the λ-value (λM) of the exhaust gas fed to the NOx storage catalyst at the beginning of the regeneration phase to a constant pilot value (λREG), and starting the control of the λ-value (λK) to the value of one only after the λ-value (λK) of the exhaust gas emitted by the NOx storage catalyst falls below a predetermined intervention value (λi), wherein the step of controlling the λ-value (λM) of the exhaust gas to a constant pilot value (λREG) includes making a predetermined afterinjection and controlling the λ-value of the main combustion such that the λ-value (λM) value of the exhaust gas fed to the NOx storage catalyst assumes the constant pilot value (λREG); and controlling the λ-value (λM) of the exhaust gas fed to the NOx storage catalyst according to the formula $$\lambda_M = \lambda_{REG} + k^*(\lambda_i - \lambda_K)$$

wherein k is a constant.

2. A The process for controlling the mixture composition for an Otto engine with an NOx storage catalyst during a regeneration phase, the process comprising:

controlling, to the value of one, a λ-value (λM) of an exhaust gas fed to the NOx storage catalyst during a regeneration phase as a function of a λ-value (λK) of an exhaust gas emitted by the NOx storage catalyst;

controlling the λ-value ($\lambda_M$) of the exhaust gas fed to the NO$_x$ storage catalyst at the beginning of the regeneration phase to a constant pilot value ($\lambda_{REG}$), and starting the control of the λ-value ($\lambda_K$) to the value of one only after the λ-value ($\lambda_K$) of the exhaust gas emitted by the NOx storage catalyst falls below a predetermined intervention value ($\lambda_i$), wherein the step of controlling the λ-value ($\lambda_M$) of the exhaust gas to a constant pilot value ($\lambda_{REG}$) includes making a predetermined afteriniection and controlling the λ-value of the main combustion such that the λ-value ($\lambda_M$) value of the exhaust gas fed to the NOx storage catalyst assumes the constant pilot value ($\lambda_{REG}$); and controlling the λ-value ($\lambda_M$) of the exhaust gas fed to the NOx storage catalyst according to the formula $$\lambda_M = \lambda_{REG} + k^*(\lambda_i - \lambda_K)$$

wherein k is a constant.

3. A system for controlling the mixture composition for an Otto engine having an NO$_x$ storage catalyst during a regeneration phase, the system comprising a control device for controlling, to the value of one, a λ-value ($\lambda_M$) of the exhaust gas fed to the NO$_x$ storage catalyst during the regeneration phase as a function of the λ-value ($\lambda_K$) of the exhaust gas emitted by the NO$_x$ storage catalyst, wherein the control device controls the λ-value ($\lambda_M$) such that the λ-value ($\lambda_K$) of the exhaust gas emitted by the NO$_x$ storage catalyst does not fall under a value of one or falls only insignificantly under a value of one, wherein the control device initiates the regeneration phase when an NO$_x$ content of the exhaust gas emitted by the NO$_x$ storage catalyst exceeds a predetermined value, wherein the control device terminates the regeneration phase when the λ-value ($\lambda_K$) of the exhaust gas emitted by the NO$_x$ storage catalyst falls below a predetermined value, wherein the control device controls the λ-value ($\lambda_M$) of the exhaust gas fed to the NO$_x$ storage catalyst at the beginning of the regeneration phase to a constant pilot value ($\lambda_{REG}$), and starts the control of the λ-value ($\lambda_K$) to the value of one only after the λ-value ($\lambda_K$) of the exhaust gas emitted by the NO$_x$ storage catalyst falls below a predetermined intervention value ($\lambda_i$), wherein the control device makes a predetermined afterinjection and controlling the λ-value of the main combustion such that the λ-value ($\lambda_M$) value of the exhaust gas fed to the NO$_x$ storage catalyst assumes the constant pilot value ($\lambda_{REG}$), and wherein the control device controls the λ-value ($\lambda_M$) of the exhaust gas fed to the NO$_x$ storage catalyst according to the formula $$\lambda_M = \lambda_{REG} + k^*(\lambda_i - \lambda_K)$$

wherein k is a constant.

4. A system for controlling the mixture composition for an Otto engine having an NO$_x$ storage catalyst during a regeneration phase, the system comprising a control device for controlling, to the value of one, a λ-value ($\lambda_M$) of the exhaust gas fed to the NO$_x$ storage catalyst during the regeneration phase as a function of the λ-value ($\lambda_K$) of the exhaust gas emitted by the NO$_x$ storage catalyst, wherein the control device controls the λ-value ($\lambda_M$) of the exhaust gas fed to the NO$_x$ storage catalyst at the beginning of the regeneration phase to a constant riot value ($\lambda_{REG}$), and starts the control of the λ-value ($\lambda_K$) to the value of one only after the λ-value ($\lambda_K$) of the exhaust gas emitted by the NO$_x$ storage catalyst falls below a predetermined intervention value ($\lambda_i$), wherein the control device makes a predetermined afterinjection and controlling the λ-value of the main combustion such that the λ-value ($\lambda_M$) value of the exhaust gas fed to the NO$_x$ storage catalyst assumes the constant pilot value ($\lambda_{REG}$), and wherein the control device controls the λ-value ($\lambda_M$) of the exhaust gas fed to the NO$_x$ storage catalyst according to the formula $$\lambda_M = \lambda_{REG} + k^*(\lambda_i - \lambda_K)$$

wherein k is a constant.

* * * * *